(12) United States Patent
Liao et al.

(10) Patent No.: US 9,521,205 B1
(45) Date of Patent: Dec. 13, 2016

(54) ANALYZING CHANGES IN WEB ANALYTICS METRICS

(75) Inventors: Lin Liao, Bothell, WA (US); Jiang Ni, Redmond, WA (US); Elizabeth L. Liebert, Honolulu, HI (US)

(73) Assignee: Google Inc., Mountain View, CA (US)

( * ) Notice: Subject to any disclaimer, the term of this patent is extended or adjusted under 35 U.S.C. 154(b) by 1170 days.

(21) Appl. No.: 13/136,507

(22) Filed: Aug. 1, 2011

(51) Int. Cl.
 G06F 15/173 (2006.01)
 G06Q 30/00 (2012.01)
 H04L 29/08 (2006.01)
 G06Q 30/02 (2012.01)

(52) U.S. Cl.
 CPC ............... *H04L 67/22* (2013.01); *G06Q 30/02* (2013.01)

(58) Field of Classification Search
 CPC ............ H06Q 10/0639; H06Q 30/0201; G06F 11/3438; G06F 11/3452; H06L 67/22; H04L 67/22; H04L 67/02
 USPC ......................................... 709/224; 705/14.45
 See application file for complete search history.

(56) References Cited

U.S. PATENT DOCUMENTS

| | | | |
|---|---|---|---|
| 6,606,657 B1 * | 8/2003 | Zilberstein et al. | 709/224 |
| 6,839,680 B1 * | 1/2005 | Liu | G06Q 30/0204 705/7.33 |
| 6,904,461 B1 * | 6/2005 | Randhava et al. | 709/224 |
| 7,386,473 B2 * | 6/2008 | Blumenau | 705/14.4 |
| 7,409,593 B2 * | 8/2008 | Aaron | 714/26 |
| 7,529,835 B1 * | 5/2009 | Agronow | G06F 17/30902 709/203 |
| 7,886,047 B1 * | 2/2011 | Potluri | H04L 67/22 709/224 |
| 7,895,072 B1 * | 2/2011 | Manzi et al. | 705/7.11 |
| 8,010,399 B1 * | 8/2011 | Bruce et al. | 705/7.29 |
| 8,166,155 B1 * | 4/2012 | Rachmeler et al. | 709/224 |
| 8,234,582 B1 * | 7/2012 | Haynes et al. | 715/764 |
| 8,396,742 B1 * | 3/2013 | Blume et al. | 705/14.1 |
| 8,744,898 B1 * | 6/2014 | Hewett et al. | 705/7.31 |
| 8,805,715 B1 * | 8/2014 | Jones et al. | 705/7.33 |
| 9,092,539 B2 * | 7/2015 | Seifert | H04L 67/2814 |
| 2003/0023715 A1 * | 1/2003 | Reiner et al. | 709/224 |
| 2003/0033407 A1 * | 2/2003 | Low | 709/224 |
| 2003/0110255 A1 * | 6/2003 | Tarquini et al. | 709/224 |

(Continued)

OTHER PUBLICATIONS

"Web analytics", Wikipedia.org [online] [Retrieved on Aug. 1, 2011]. Retrieved from the Internet: <URL: http://en.wikipedia.org/wiki/Web_analytics>, 12 pgs.

*Primary Examiner* — Madhu Woolcock
(74) *Attorney, Agent, or Firm* — Fish & Richardson P.C.

(57) ABSTRACT

Methods, systems, and apparatus, including computer programs encoded on a computer storage medium, for analyzing changes in web analytics metrics. In one aspect, a method includes identifying a change in a web analytics metric for a website over a period of time, the web analytics metric being based at least in part on visitor data for the website over the period of time; computing a respective segment contribution score for each of a plurality of segments of the web analytics metric, wherein a segment contribution score for a particular segment is based at least in part on a comparison between a value of the web analytics metric and a value of the particular segment during the period of time; and identifying one or more of the plurality of segments as contributing to the change in the web analytics metric based on the respective segment contribution scores.

16 Claims, 4 Drawing Sheets

(56) References Cited

U.S. PATENT DOCUMENTS

| | | | |
|---|---|---|---|
| 2003/0115121 A1* | 6/2003 | Bremner | G06Q 30/02 705/35 |
| 2003/0208594 A1* | 11/2003 | Muret | H04L 67/22 709/224 |
| 2004/0176992 A1* | 9/2004 | Santos | G06Q 10/0639 705/7.33 |
| 2005/0050045 A1* | 3/2005 | Taira et al. | 707/9 |
| 2005/0177413 A1* | 8/2005 | Blumberg et al. | 705/10 |
| 2007/0067297 A1* | 3/2007 | Kublickis | 707/9 |
| 2007/0083504 A1* | 4/2007 | Britt et al. | 707/5 |
| 2007/0198321 A1* | 8/2007 | Lakshminarayan | G06F 17/30864 705/7.33 |
| 2007/0214097 A1* | 9/2007 | Parsons et al. | 706/12 |
| 2008/0059348 A1* | 3/2008 | Glassman et al. | 705/35 |
| 2008/0103853 A1* | 5/2008 | Watanabe et al. | 705/7 |
| 2008/0183745 A1* | 7/2008 | Cancel et al. | 707/102 |
| 2008/0215355 A1* | 9/2008 | Herring et al. | 705/1 |
| 2008/0288889 A1* | 11/2008 | Hunt et al. | 715/810 |
| 2008/0306830 A1* | 12/2008 | Lasa | G06Q 30/02 705/14.16 |
| 2009/0048904 A1* | 2/2009 | Newton et al. | 705/10 |
| 2009/0138446 A1* | 5/2009 | Kalavade | 707/3 |
| 2009/0292677 A1* | 11/2009 | Kim | 707/3 |
| 2009/0327424 A1* | 12/2009 | Bernstein | G06Q 10/06 709/205 |
| 2009/0327913 A1* | 12/2009 | Adar | G06F 17/30876 715/745 |
| 2010/0235908 A1* | 9/2010 | Eynon et al. | 726/22 |
| 2011/0022429 A1* | 1/2011 | Yates | G06Q 10/00 705/313 |
| 2011/0119126 A1* | 5/2011 | Park | G06Q 30/02 705/14.45 |
| 2011/0208565 A1* | 8/2011 | Ross et al. | 705/7.38 |
| 2011/0246511 A1* | 10/2011 | Smith et al. | 707/769 |
| 2011/0320395 A1* | 12/2011 | Dada | G06Q 30/02 706/47 |

* cited by examiner

ANALYZING CHANGES IN WEB ANALYTICS METRICS

BACKGROUND

This specification relates to web analytics.

Web analytics systems provide information about website visitors to users. In particular, web analytics systems provide information about one or more web analytics metrics that are each generated based at least in part on information about visits to the web site. When a web analytics metric for a web site undergoes a large change in a short amount of time, users, e.g., entities that own or manage the web site, may desire to understand the cause of the change.

SUMMARY

In general, one innovative aspect of the subject matter described in this specification can be embodied in methods that include the actions of identifying a change in a web analytics metric for a website over a period of time, the web analytics metric being based at least in part on visitor data for the website over the period of time; computing a respective segment contribution score for each of a plurality of segments of the web analytics metric, wherein a segment contribution score for a particular segment is based at least in part on a comparison between a value of the web analytics metric and a value of the particular segment during the period of time; and identifying one or more of the plurality of segments as contributing to the change in the web analytics metric based on the respective segment contribution scores. Other embodiments of this aspect include corresponding systems, apparatus, and computer programs, configured to perform the actions of the methods, encoded on computer storage devices.

These and other embodiments can each optionally include one or more of the following features. Identifying one or more of the plurality of segments can include: ranking the plurality of segments according to the respective segment contribution scores; and identifying one or more of the plurality of segments as contributing to the change in the web analytics metric based on the ranking.

The method can further include, for each of the one or more identified segments, computing a probability that the identified segment caused the change in the web analytics metric based on the respective segment contribution score for the identified segment. The method can further include providing data identifying the one or more segments for presentation in a user interface.

Computing a respective segment contribution score for each of the plurality of segments of the web analytics metric can include: identifying a plurality of candidate segments, each candidate segment being defined by a respective attribute-value pair of the web analytics metric; selecting one or more candidate segments that each have a sufficient quantity of website visitor data; and computing segment contribution scores only for the selected candidate segments.

The plurality of segments can include single-dimensional segments and multi-dimensional segments.

The web analytics metric can be an additive metric and a respective segment contribution score for a particular segment can be equal to $$vs_{t2}/v_{t2} - vs_{t1}/v_{t1},$$

wherein $v_{t1}$ is a value of the web analytics metric at an earliest time in the period of time, $v_{t2}$ is a value of the web analytics metric at a latest time in the period of time, $vs_{t1}$ is a value of the segment S at the earliest time, and $vs_{t2}$ is a value of the segment S at the latest time.

The web analytics metric can be a ratio metric and a respective segment contribution score for a particular segment can be equal to $$k*(vs_{t2}-v_{t2})ws_{t2}-(vs_{t1}-v_{t1})ws_{t1},$$

wherein $v_{t1}$ is a value of the web analytics metric at an earliest time in the period of time, $v_{t2}$ is a value of the web analytics metric at a latest time in the period of time, $vs_{t1}$ is a value of the segment S at the earliest time, $vs_{t2}$ is a value of the segment S at the latest time, $ws_{t1}$ is a value of a weight time series of the segment S at an earliest time, $ws_{t2}$ is a value of the weight time series of the segment S at the latest time, and k is a normalization constant.

Particular embodiments of the subject matter described in this specification can be implemented so as to realize one or more of the following advantages. Users are able to effectively and quickly identify the segments of a metric that contributed to a change in the metric. A segment of a metric can be associated with a score that makes it easy for a user to see how likely it is that the segment contributed to the change in the metric. Allowing a user to easily identify the segments that contributed to the change in the metric may help users understand the underlying causes of the change in the metric and enable users to take actions to improve the performance of their web sites.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
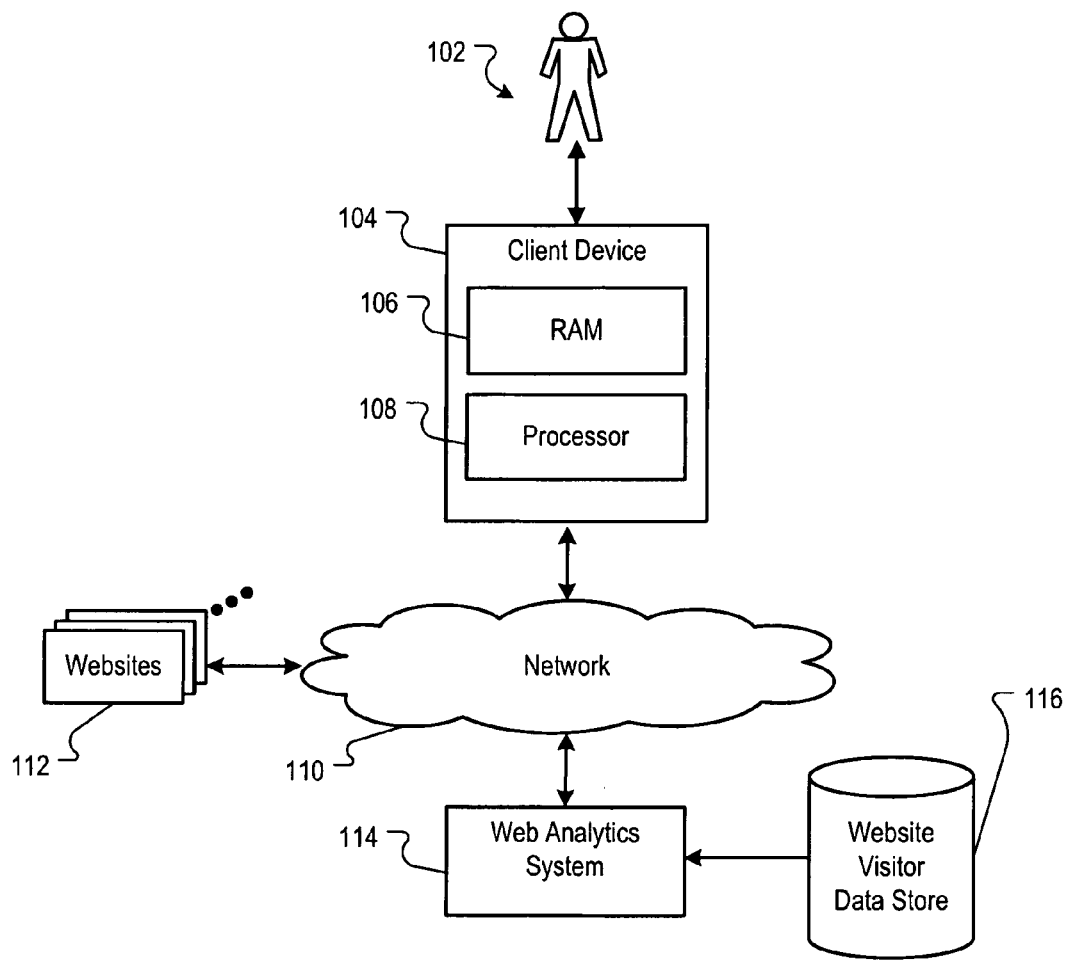
FIG. 1 shows an example web analytics system.

FIG. 1 shows an example web analytics system 114. A user 102 can submit requests to web sites 112 and web analytics system 114 through a client device 104. For example, the client device 104 can be a data processing apparatus that can communicate with the websites 112 and the web analytics system 114 through a network 110. The network 110 can be, for example, a local area network (LAN) or wide area network (WAN), e.g., the Internet. The client device 104 will generally include a random access memory (RAM) 106 and a processor 108. The client device 104 will also generally include a software application, e.g., a web browser or other communication software, to facilitate the sending and receiving of data over the network.

Each of the web sites 112 includes one or more resources associated with a domain name and can be hosted by one or more servers in one or more physical locations. Respective publishers and/or advertisers, e.g., entities that manage and/or own the web sites 112, maintain the web sites 112. Resources included in the web sites 112 are each associated with a resource address, e.g., a Uniform Resource Locator (URL), and can include, for example, hypertext markup language (HTML) pages, word processing documents, portable document format (PDF) documents, images, video, and feed sources. The resources include content, such as words, phrases, pictures, and so on, and may include embedded information (such as meta information and hyperlinks) and/or embedded instructions (such as JAVASCRIPT scripts).

The entities that manage or own the web sites 112 may desire to obtain information about visitors to their sites using the web analytics system 114, which can be implemented on one or more data processing apparatus in one or more locations. For a particular one of the web sites 112, web analytics system 114 can use collected website visitor data for the website to present information about one or more web analytics metrics relating to the web site. In some implementations, the metrics include individual metrics for each of one or more of the resources included in the web site. In general, each web analytics metric is a time series, i.e., a series of numbers or other information having associated timestamps, that is derived from the website visitor data.

The web analytics system 114 obtains the collected visitor data from a data store, e.g., website visitor data store 116. For each visit to the website, the website visitor data can include attributes of the visit. For example, for a given visit to the website, the website visitor data can include one or more of the following attributes: the time of the visit, the landing resource of the visit, the source of the visit, the geographic location of the device used by the visitor during the visit, the duration of the visit, the actions taken by the visitor while visiting the web site, and so on. Other attributes are possible. For example, for a visit to the website www.examplesite.com, the collected visitor data can indicate that: the time of the visit was 12:00 pm; the landing resource, i.e., the first resource accessed during the visit, was www.examplesite.com/homepage.html; the source of the visit, e.g., a resource including a hyperlink accessed to initiate the visit, was www.searchengine.com; the geographic location of the device used by the visitor was the United States; the duration of the visit was 33 minutes; the visitor purchased widget X during the visit; and so on.

Using the collected information, the web analytics system 114 can generate one or more web analytics metrics for the web site. The web analytics metrics can include additive metrics, e.g., page views and unique page views. As an example, a page views metric can measure the number of page views of a resource in the web site each day, each hour, and so on. Similarly, a unique page views metric can measure the number of page views coming from unique visitors, i.e., the unique page views will count all page views from the same visitor as a single page view. Generally, an additive metric is a metric that is generated by adding numbers together. Other additive metrics are possible.

The web analytics metrics can also include ratio metrics, e.g., conversion rate. Generally, a ratio metric is a metric that is generated by dividing one number by another. In the case of conversion rate, the conversion rate metric for a particular resource is the number of conversions, e.g., purchases or other specific actions taken by a visitor while visiting the resource, divided by the number of visits to the resource. Other ratio metrics are possible.

The web analytics system 114 can also identify one or more segments of each web analytics metric. A segment of a metric is defined by one or more attribute-value pairs. That is, for a particular metric, a segment defined by a particular attribute-value pair includes only visits having that particular attribute value. For example, for a metric that measures total visits to a web page in the web site, the segment defined by the attribute-value pair "country=Germany" measures the total visits to the web page from users in Germany. A segment that is defined by a single attribute-value pair can be referred to as a single-dimensional segment. Alternatively, a segment may be multi-dimensional, i.e., defined by more than one attribute-value pair. For example, for the total visits metric, the segment defined by the attribute-value pairs "country=Germany" and "source=searchengine.com" measures the total visits to the web page from users in Germany that come from searchengine.com.

When a change is identified in a web analytics metric over a period of time, the web analytics system 114 may analyze values of the metric and of one or more segments of the metric over the period of time to identify the segments that are likely to have contributed to the identified change.

Figure 2:
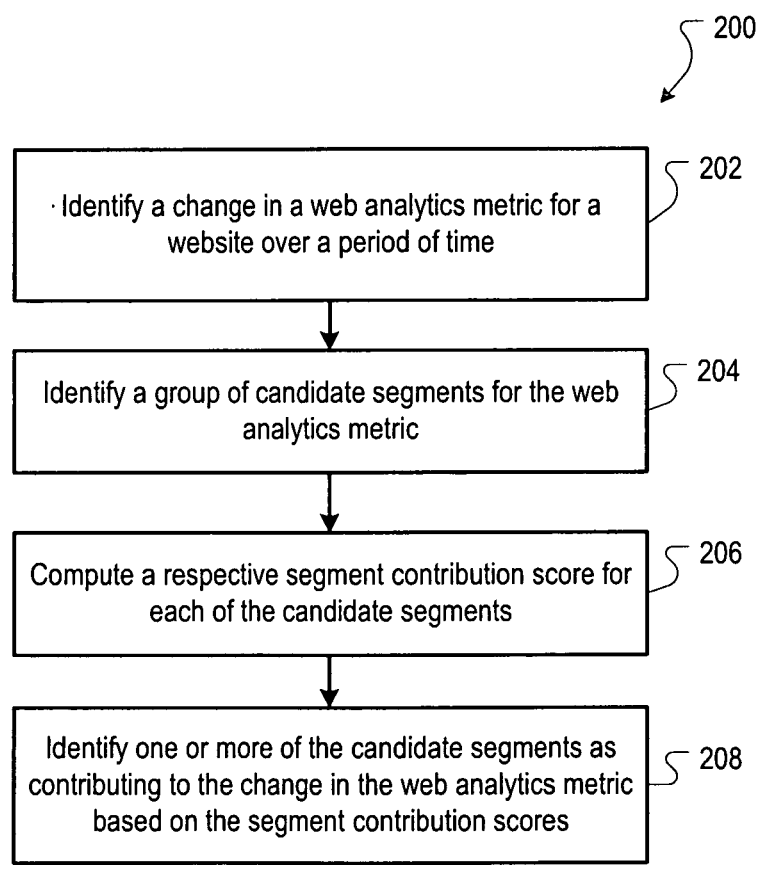
FIG. 2 is a flow diagram of an example technique for identifying segments that contributed to a change in a web analytics metric.

FIG. 2 is a flow diagram of an example technique 200 for identifying segments that contributed to a change in a web analytics metric. The technique 200 can be performed by one or more data processing apparatus. For example, a web analytics system, e.g., the web analytics system 114 of FIG. 1, can be used to perform the technique 200.

The system identifies 202 a change in a web analytics metric for a website over a period of time. In some implementations, the system can receive data identifying the metric and the period of time from a user. For example, a user may desire to understand the reason a particular metric changed over a particular period of time, and may submit a request to the system that identifies the particular metric and the particular period of time.

Alternatively, the system may monitor the values of one or more metrics for the website over time. When the change in one of the metrics exceeds a threshold value in a specified period of time, the system can identify the metric and the specified period of time. The monitored metrics and the threshold value may be specified by a user. For example, the user may set an alert that identifies a metric, a specified time period, and a threshold value. When the metric changes by more than the threshold value over the specified time period, the system generates a report that identifies the segments of the metric that contributed to the change.

The system identifies 204 a group of candidate segments of the metric. In some implementations, the system identifies each single-dimensional segment for which there is visitor data as a candidate segment. That is, the system generates a segment of the metric for each attribute value possessed by at least one of the visits used to generate the metric. Alternatively, the system can identify only those segments that have a sufficient amount of visitor data as candidate segments. For example, the system can identify only those segments having a number of visits that exceeds a threshold value, only those segments having a number of visits that exceeds a threshold proportion of the total number of visits for the segment, and so on.

The system computes 206 a respective segment contribution score for each of the candidate segments of the web analytics metric. If the web analytics metric is an additive metric, the segment contribution score for a particular segment can be determined based on a ratio of the value of the segment to the value of the web analytics metric at each end point of the time period, i.e., at a latest time in the time period and an earliest time in the time period. For example, for a segment S, the segment contribution score SCS(S) can be expressed as:

$$SCS(S) = vs_{t2}/v_{t2} - vs_{t1}/v_{t1},$$

where $v_{t1}$ is the value of the web analytics metric at the earliest time in the period of time, $v_{t2}$ is the value of the web analytics metric at the latest time in the period of time, $vs_{t1}$ is a value of the segment S at the earliest time, and $vs_{t2}$ is a value of the segment S at the latest time.

Alternatively, if the web analytics metric is a ratio metric, the segment contribution score SCS(S) of a segment S can be equal to:

$$SCS(S) = k*[(vs_{t2} - v_{t2})ws_{t2} - (vs_{t1} - v_{t1})ws_{t1}],$$

where $v_{t1}$ is the value of the web analytics metric at the earliest time in the period of time, $v_{t2}$ is the value of the web analytics metric at the latest time in the period of time, $vs_{t1}$ is the value of the segment S at the earliest time, $vs_{t2}$ is the value of the segment S at the latest time, $ws_{t1}$ is the value of a weight time series of the segment S at the earliest time, $ws_{t2}$ is the value of the weight time series of the segment S at the latest time, and k is a normalization constant.

The weight time series of a segment S of a ratio metric is the time series of the denominator of the segment. For example, the weight time series of a conversion rate metric, defined as conversions divided by the number of visits, is the time series of the visits metric. Analogously, the weight time series of a segment of the web analytics metric is the time series of the denominator of the segment.

Other ways of calculating segment contribution scores are also possible. For example, for a particular segment, the segment contribution score may be calculated based on the absolute change in the segment, i.e., without comparing the change in the segment to the change in the metric. Alternatively, the segment contribution score may be calculated based on a percentage change in the segment from the beginning of the period of time to the end of the period of time.

The system identifies 208 one or more of the candidate segments as contributing to the change in the web analytics metric based on the respective segment contribution scores. For example, the system can identify a specified number of candidate segments having the highest segment contribution scores or each candidate segment having a segment contribution score that is beyond a threshold value.

In some implementations, the system uses the segment contribution scores to generate a probability for each candidate segment. The generated probability for a candidate segment represents the likelihood that the candidate segment is responsible for the change in the web analytics metric. The probabilities can be defined using, e.g., a logistic function. For example, for a segment S, the probability P(S) can be expressed as:

$$P(S) = \exp(w*SCS(S))/(\exp(w*SCS(S)) + \exp(-w*SCS(S))),$$

where SCS(S) is the segment contribution score of the segment S and w is a pre-determined constant that represents a weight assigned to the segment contribution scores. Once the probabilities are computed, the system can use the probabilities, rather than the segment contribution scores, to select the candidate segments that contributed to the change. For example, the system can select a specified number of candidate segments having the highest probabilities or each candidate segment having a probability beyond a threshold value.

The system can transmit information that identifies the segments that contributed to the change and one or more of their associated segment contribution scores or probabilities to a client device for presentation to a user in a user interface. An example user interface for displaying information about the contributing segments is described in more detail below with reference to FIG. 4.

In some implementations, the system can also identify multi-dimensional segments of the web analytics metric that may be responsible for the change.

Figure 3:
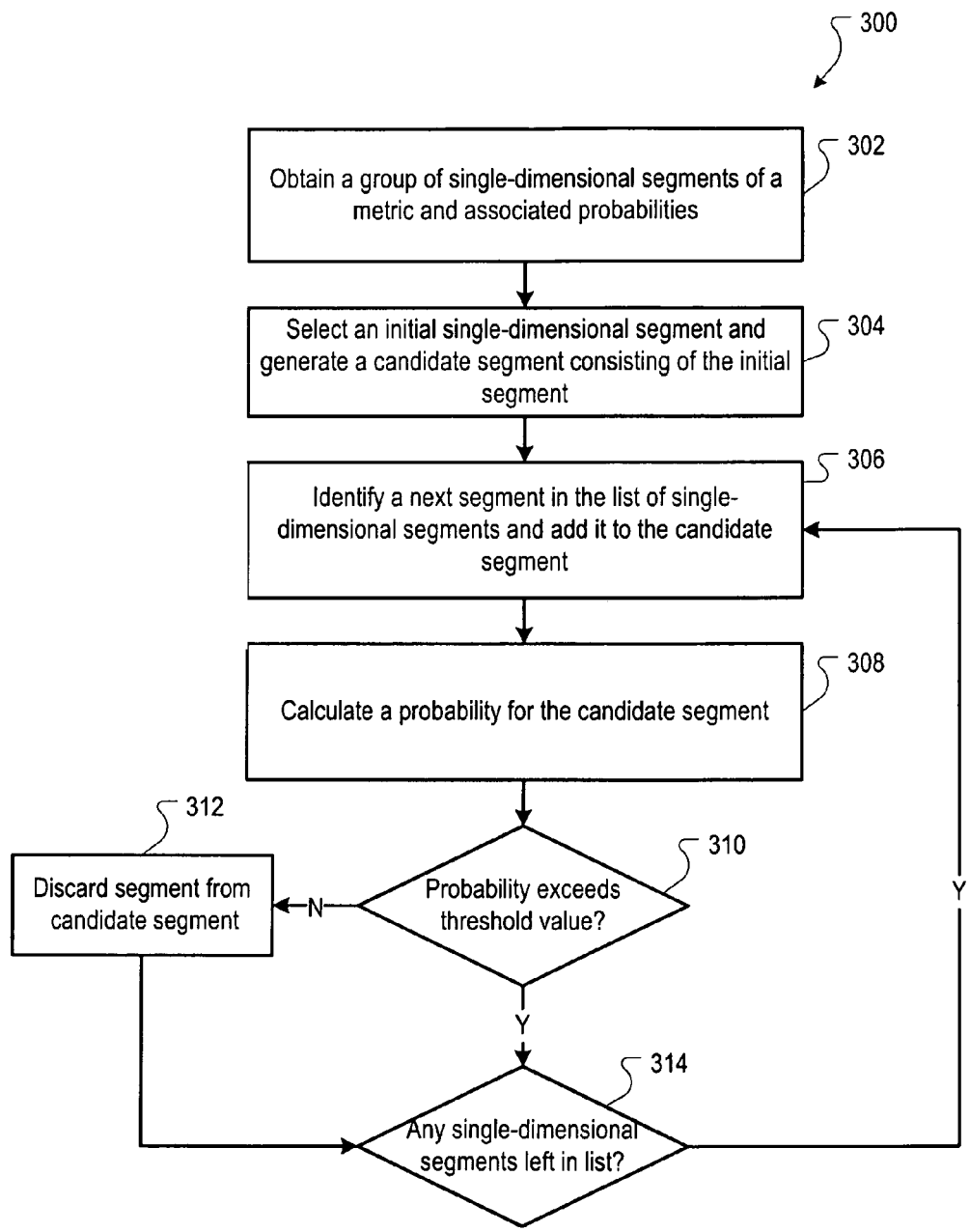
FIG. 3 is a flow diagram of an example technique for identifying multi-dimensional segments that contributed to a change in a web analytics metric.

FIG. 3 is a flow diagram of an example technique 300 for identifying multi-dimensional segments that contributed to a change in a web analytics metric. The technique 300 can be performed by one or more data processing apparatus. For example, a web analytics system (e.g., the web analytics system 114 of FIG. 1) can be used to perform the technique 300.

The system obtains 302 a group of single-dimensional segments of the metric that contributed to the change and associated probabilities for each of the single-dimensional segments. The segments can have been selected from a group of candidate segments using, for example, the technique described above with reference with FIG. 2. Once obtained, the system can order the segments according to their probabilities to generate an ordered list of single-dimensional segments.

The system selects 304 an initial single-dimensional segment and generates a candidate segment that includes the initial segment. The initial segment can be, for example, the single-dimensional segment having the highest probability.

The system identifies 306 a next segment in the ordered list of single-dimensional segments and adds it to the candidate segment. For example, if the metric is total visits to a web page in the web site, the initial segment is defined by the attribute-value pair "country=Germany," and the next segment is defined by the attribute-value pair "source=searchengine.com," adding the next segment to the candidate segment results in a multi-dimensional segment that measures the total visits to the web page from users in Germany that come from searchengine.com.

The system calculates 308 a probability for the candidate segment. In order to calculate the probability for the candidate segment, the system can calculate a segment contribution score for the candidate segment, e.g., as described above with reference to FIG. 2. The system can then use the segment contribution score to calculate the probability.

The system determines 310 whether the probability for the candidate segment exceeds a threshold value. The threshold value can be, for example, the same as the threshold value used to select the single-dimensional segments that contributed to the change, so that a multi-dimensional segment is only included in a list of contributing segments if it is at least as likely to have contributed to the change as the single-dimensional segments in the list. Alternatively, the threshold value can be less than or more than the value used to select the single-dimensional segments.

If the probability does not exceed the threshold value, the system discards 312 the next segment from the candidate segment. The technique then proceeds to step 314. If the probability does exceed the threshold value, the system does not discard the segment and proceeds to step 314.

The system checks 314 whether any single-dimensional segments are remaining in the ordered list. If single-dimensional segments remain, the system repeats step 306. If no single-dimensional segments remain, the technique ends. If, at the end of the technique 300, the candidate segment contains only the initial single-dimensional segment, the system can discard the candidate segment.

Thus, technique 300 results in a multi-dimensional segment whose associated probability exceeds a threshold value. In some implementations, the system may repeat the technique 300 with a different initial single-dimensional segment to identify additional multi-dimensional segments. For example, of the single-dimensional segments in the obtained group of candidate single-dimensional segment not included in the multi-dimensional segment, the system may identify the segment having the highest probability. The system may then repeat the technique 300 with that segment as the initial segment. The system may continue repeating the technique 300 until each segment in the group of single-dimensional segments is either included in a multi-dimensional segment or the candidate multi-dimensional segment with the segment as the initial segment is discarded.

In another example, the system may repeat the technique 300 until each of the group of single-dimensional segments has been selected as the initial segment, without regard for whether the single-dimensional segment has already been included in a multi-dimensional segment.

In some implementations, instead of or in addition to obtaining probabilities for each single-dimensional segment in the group of single-dimensional segments, the system can obtain a respective segment contribution score for each single-dimensional segment. In these implementations, the system can order the single-dimensional segments according to their segment contribution scores and can calculate segment contribution scores for the candidate segment without needing to compute a probability. The system can then compare the segment contribution score to a threshold value to determine whether to discard or keep a single-dimensional segment in the candidate segment.

Other techniques for identifying multi-dimensional segments that contributed to a change in a web analytics metric are also possible. In some implementations, once the system has obtained the group of single-dimensional segments of the metric that contributed to the change, the system may repeat the technique 200 and identify a change in a particular one of the group of single-dimensional segments, rather than a change in the web analytics metric. For example, the system may repeat the technique 200 to identify a change in the highest-scoring single-dimensional segment, resulting in one or more multi-dimensional segments that contributed to the change in the highest-scoring single-dimensional segment. Each of the resulting multi-dimensional segments is defined by two attribute-value pairs: the attribute-value pair that defines the highest-scoring single-dimensional segment and a second attribute-value pair identified by performing the technique 200. If one or more of the resulting multi-dimensional segments have scores or probabilities that exceed a threshold value, the system may identify those multi-dimensional segments as contributing to a change in the web analytics metric.

Figure 4:
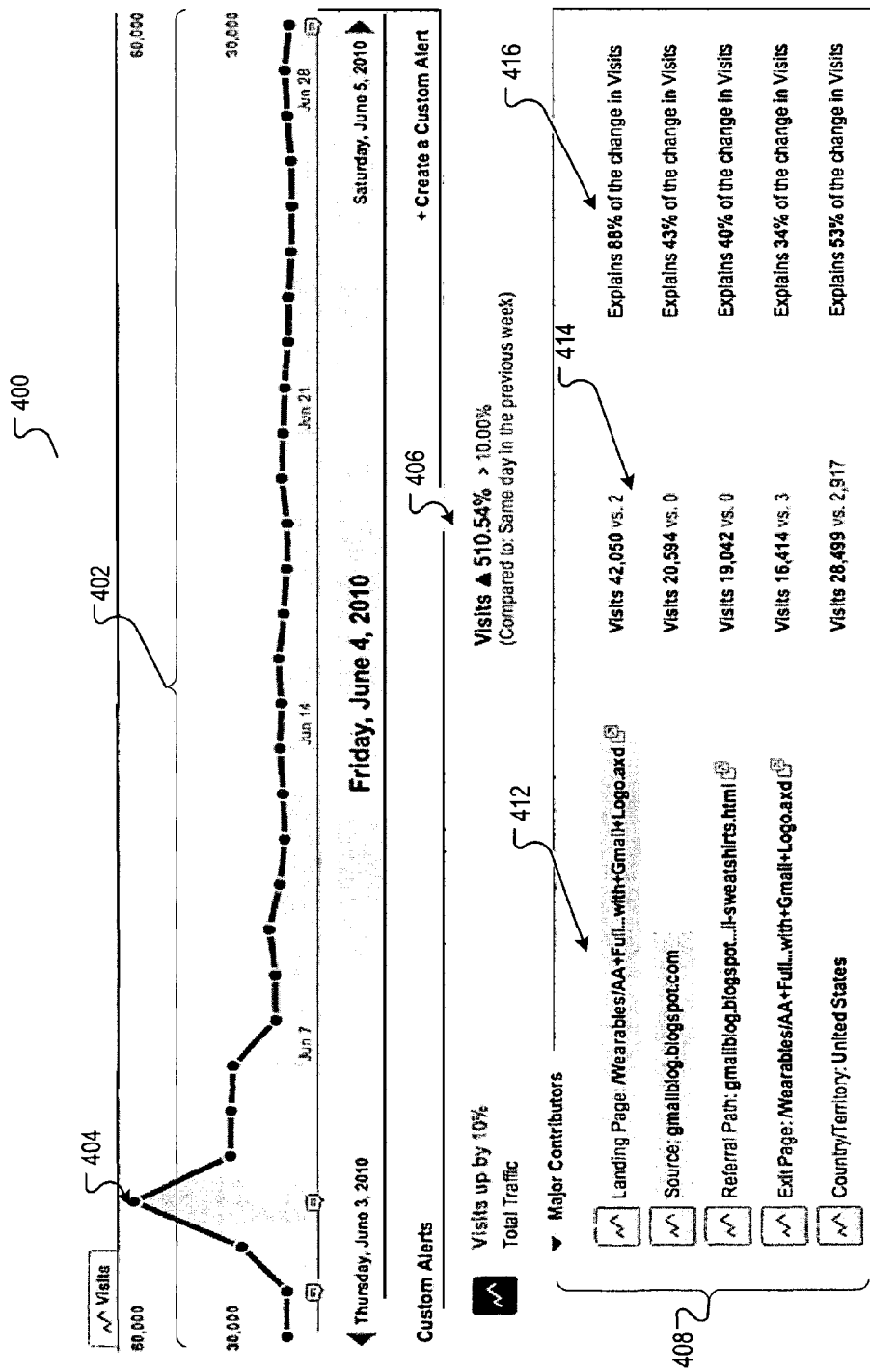
FIG. 4 shows an example graphical user interface for displaying information about segments that contributed to a change in a web analytics metric.

FIG. 4 shows an example graphical user interface 400 for displaying the segments that contributed to a change in a web analytics metric. The user interface 400 can be presented to a user on a client device, e.g., a personal computer or a smart phone, and can have been sent to the client device by a web analytics system, e.g., the web analytics system 114 of FIG. 1. The user interface 400 displays information about a visits metric for a particular web site. The example user interface 400 includes a graph 402 of visits to the web site for each day in the month of June. As can be seen in the graph at node 404, the value of the visits metric on June $4^{th}$ was much higher than on any other day of the month. In particular, the visits to the site increased by 510.54% from the same day in the previous week, as indicated by node 406.

In an attempt to provide more information on the potential cause for the rise in visitors on that date, the example user interface 400 displays a list of major contributors 408 to the change in the visits metric. The list of major contributors 408 can be displayed in the user interface 400, e.g., only when the increase in the metric exceeds a threshold amount. The threshold amount can be specified by a user or be a default system-generated value. In the illustrated example, the threshold amount is a 10% increase from the same day in the previous week.

Each of the major contributors 408 is a segment of the visits metric identified by the web analytics system as contributing to the change in the visits metric on that date. Each major contributor 408 is displayed along with the number of visits having the attribute-value pair that define the segment and a percentage that represents the percentage of the change that is explained by the increase in that metric.

For example, the segment 412 defined by the attribute-value pair "landing page=/Wearables/AA+Full . . . with+ Gmail+Logo.axd" had 42,050 visits on June $4^{th}$, as opposed to 2 on the same day a week earlier (node 414). Additionally, the segment 412 explains 88% (node 416) of the change to the visits metric on that day. The percentage associated with each segment can have been derived by the web analytics system from the segment contribution score for the segment. In some implementations, rather than the illustrated percentage, the user interface 400 can display a probability for each segment, such that the probabilities for all of the contributing segments add to one.

While the systems and techniques described above have been described with reference to identifying the segments that contributed to changes in web analytics metrics, the same techniques may also be used to analyze changes in other types of metrics. That is, the systems and techniques described above may be used to analyze changes over time in any metric generated based on collected data having different attributes. For example, the systems and techniques described above may be used to analyze changes in advertising metrics, i.e., metrics that are generated based on collected advertisement impression data and that inform an advertiser about the effectiveness of their ad campaign.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

obtaining, by one or more data processing apparatus, from a data store, and over a network, visitor data collected from one or more client devices accessing, over the network, one or more remote servers that manage websites visited by the one or more client devices;

identifying, by the one or more data processing apparatus, a change in a web analytics metric for a given website over a period of time, the web analytics metric being based at least in part on the visitor data associated with the one or more client devices accessing, over the network, the one or more remote servers to visit the given website during the period of time;

computing, by the one or more data processing apparatus, a respective segment contribution score for each of a plurality of segments of the web analytics metric, wherein each of the plurality of segments of the web analytics metric is defined by a respective set of one or more attribute-value pairs such that values of the segment are determined only from visits to the given website that have attribute values that satisfy each of the attribute-value pairs that define the segment, and wherein computing the respective segment contribution score for each of the plurality of segments comprises:

determining a first comparison between (i) a value of the web analytics metric at an earliest time in the period of time and (ii) a value of the segment at the earliest time in the period of time, determining a second comparison between (iii) a value of the web analytics metric at a latest time in the period of time and (iv) a value of the segment at the latest time in the period of time, and computing the respective segment contribution score for each of the plurality of segments of the web analytics metric from the first comparison and the second comparison; and identifying, by the one or more data processing apparatus, one or more of the plurality of segments as contributing to the change in the web analytics metric based on the respective segment contribution scores, wherein the web analytics metric is an additive metric and wherein the respective segment contribution score for each of the plurality of segments is equal to:

$$VS_{t2}/V_{t2} - VS_{t1}/V_{t1}, \text{ or}$$

$$k*(VS_{t2}-V_{t2})WS_{t2} - (VS_{t1}-V_{t1})WS_{t1}, \text{ and}$$

wherein $V_{t1}$ is the value of the web analytics metric at the earliest time, $V_{t2}$ is the value of the web analytics metric at the latest time, $VS_{t1}$ is the value of the segment at the earliest time, $VS_{t2}$ is the value of the segment at the latest time, $WS_{t1}$ is a value of a weight time series of the segment at the earliest time, $WS_{t2}$ is a value of the weight time series of the segment at the latest time, and k is a normalization constant.

2. The method of claim 1, wherein the identifying one or more of the plurality of segments comprises:

ranking the plurality of segments according to the respective segment contribution scores; and identifying one or more of the plurality of segments as contributing to the change in the web analytics metric based on the ranking.

3. The method of claim 1, further comprising, for each of the identified one or more of the plurality of segments, computing a probability that the identified segment caused the change in the web analytics metric based on the respective segment contribution score for the identified segment.

4. The method of claim 1, further comprising providing data identifying the identified one or more of the plurality of segments for presentation in a user interface.

5. The method of claim 1, further comprising determining the plurality of segments of the web analytics metric, and wherein determining the plurality of segments comprises:

identifying a plurality of candidate segments of the web analytics metric, each candidate segment being computed only from visits to the given website that have attribute values that satisfy one or more respective attribute-value pairs; and selecting one or more candidate segments that each have a number of visits that exceeds a threshold value.

6. The method of claim 1, wherein the plurality of segments includes single-dimensional segments and multi-dimensional segments.

7. A computer-readable storage device having stored thereon instructions, which, when executed by one or more data processing apparatus, cause the one or more data processing apparatus to perform operations comprising:

obtaining, by the one or more data processing apparatus, from a data store, and over a network, visitor data collected from one or more client devices accessing, over the network, one or more remote servers that manage websites visited by the one or more client devices;

identifying, by the one or more data processing apparatus, a change in a web analytics metric for a given website over a period of time, the web analytics metric being based at least in part on the visitor data associated with the one or more client devices accessing, over the network, the one or more remote servers to visit the given website during the period of time;

computing, by the one or more data processing apparatus, a respective segment contribution score for each of a plurality of segments of the web analytics metric, wherein each of the plurality of segments of the web analytics metric is defined by a respective set of one or more attribute-value pairs such that values of the segment are determined only from visits to the given website that have attribute values that satisfy each of the attribute-value pairs that define the segment, and wherein computing the respective segment contribution score for each of the plurality of segments comprises:

determining a first comparison between (i) a value of the web analytics metric at an earliest time in the period of time and (ii) a value of the segment at the earliest time in the period of time, determining a second comparison between (iii) a value of the web analytics metric at a latest time in the period of time and (iv) a value of the segment at the latest time in the period of time, and computing the respective segment contribution score for each of the plurality of segments of the web analytics metric from the first comparison and the second comparison; and identifying, by the one or more data processing apparatus, one or more of the plurality of segments as contributing to the change in the web analytics metric based on the respective segment contribution scores, wherein the web analytics metric is an additive metric and wherein the respective segment contribution score for each of the plurality of segments is equal to:

$$VS_{t2}/V_{t2} - VS_{t1}/V_{t1}, \text{ or}$$

$$k*(VS_{t2}-V_{t2})WS_{t2}-(VS_{t1}-V_{t1})WS_{t1}, \text{ and}$$

wherein $V_{t1}$ is the value of the web analytics metric at the earliest time, $V_{t2}$ is the value of the web analytics metric at the latest time, $VS_{t1}$ is the value of the segment at the earliest time, $VS_{t2}$ is the value of the segment at the latest time, $WS_{t1}$ is a value of a weight time series of the segment at the earliest time, $WS_{t2}$ is a value of the weight time series of the segment at the latest time, and k is a normalization constant.

8. The computer-readable storage device of claim 7, wherein the identifying one or more of the plurality of segments comprises:

ranking the plurality of segments according to the respective segment contribution scores; and identifying one or more of the plurality of segments as contributing to the change in the web analytics metric based on the ranking.

9. The computer-readable storage device of claim 7, the operations further comprising, for each of the identified one or more of the plurality of segments, computing a probability that the identified segment caused the change in the web analytics metric based on the respective segment contribution score for the identified segment.

10. The computer-readable storage device of claim 7, the operations further comprising determining the plurality of segments of the web analytics metric, and wherein the determining the plurality of segments comprises:

identifying a plurality of candidate segments of the web analytics metric, each candidate segment being computed only from visits to the given website that have attribute values that satisfy one or more respective attribute-value pairs; and selecting one or more candidate segments that each have a number of visits that exceeds a threshold value.

11. A system comprising:
one or more data processing apparatus; and
a computer-readable storage device having stored thereon instructions that, when executed by the one or more data processing apparatus, cause the one or more data processing apparatus to perform operations comprising:

obtaining, by the one or more data processing apparatus, from a data store, and over a network, visitor data collected from one or more client devices accessing, over the network, one or more remote servers that manage websites visited by the one or more client devices;

identifying, by the one or more data processing apparatus, a change in a web analytics metric for a given website over a period of time, the web analytics metric being based at least in part on the visitor data associated with the one or more client devices accessing, over the network, the one or more remote servers to visit the given website during the period of time;

computing, by the one or more data processing apparatus, a respective segment contribution score for each of a plurality of segments of the web analytics metric, wherein each of the plurality of segments of the web analytics metric is defined by a respective set of one or more attribute-value pairs such that values of the segment are determined only from visits to the given website that have attribute values that satisfy each of the attribute-value pairs that define the segment, and wherein computing the respective segment contribution score for each of the plurality of segments comprises:

determining a first comparison between (i) a value of the web analytics metric at an earliest time in the period of time and (ii) a value of the segment at the earliest time in the period of time, determining a second comparison between (iii) a value of the web analytics metric at a latest time in the period of time and (iv) a value of the segment at the latest time in the period of time, and computing the respective segment contribution score for each of the plurality of segments of the web analytics metric from the first comparison and the second comparison; and identifying, by the one or more data processing apparatus, one or more of the plurality of segments as contributing to the change in the web analytics metric based on the respective segment contribution scores, wherein the web analytics metric is an additive metric and wherein the respective segment contribution score for each of the plurality of segments is equal to:

$$VS_{t2}/V_{t2} - VS_{t1}/V_{t1}, \text{ or}$$

$$k*(VS_{t2}-V_{t2})WS_{t2}-(VS_{t1}-V_{t1})WS_{t1}, \text{ and}$$

wherein $V_{t1}$ is the value of the web analytics metric at the earliest time, $V_{t2}$ is the value of the web analytics metric at the latest time, $VS_{t1}$ is the value of the segment at the earliest time, $VS_{t2}$ is the value of the segment at the latest time, $WS_{t1}$ is a value of a weight time series of the segment at the earliest time, $WS_{t2}$ is a value of the weight time series of the segment at the latest time, and k is a normalization constant.

12. The system of claim 11, wherein the identifying one or more of the plurality of segments comprises:

ranking the plurality of segments according to the respective segment contribution scores; and identifying one or more of the plurality of segments as contributing to the change in the web analytics metric based on the ranking.

13. The system of claim 11, the operations further comprising, for each of the identified one or more of the plurality of segments, computing a probability that the identified segment caused the change in the web analytics metric based on the respective segment contribution score for the identified segment.

14. The system of claim 11, further comprising determining the plurality of segments of the web analytics metric, and wherein determining the plurality of segments comprises:
identifying a plurality of candidate segments of the web analytics metric, each candidate segment being computed only from visits to the given website that have attribute values that satisfy one or more respective attribute-value pairs; and
selecting one or more candidate segments that each have a number of visits that exceeds a threshold value.

15. A method comprising:
obtaining, by one or more data processing apparatus, from a data store, and over a network, visitor data collected from one or more client devices accessing, over the network, one or more remote servers that manage websites visited by the one or more client devices;
identifying, by the one or more data processing apparatus, a change in a web analytics metric for a given website over a period of time, the web analytics metric being based at least in part on the visitor data associated with the one or more client devices accessing, over the network, the one or more remote servers to visit the given website during the period of time;
computing, by the one or more data processing apparatus, a respective segment contribution score for each of a plurality of segments of the web analytics metric, wherein the web analytics metric is an additive metric, and wherein the respective segment contribution score for each of the plurality of segments is equal to:

$$VS_{t2}/V_{t2} - VS_{t1}/V_{t1},$$

wherein $V_{t1}$ is a value of the web analytics metric at an earliest time in the period of time, $V_{t2}$ is a value of the web analytics metric at a latest time in the period of time, $VS_{t1}$ is a value of the segment at the earliest time, and $VS_{t2}$ is a value of the segment at the latest time; and
identifying, by the one or more data processing apparatus, one or more of the plurality of segments as contributing to the change in the web analytics metric based on the respective segment contribution scores.

16. A method comprising:
obtaining by one or more data processing apparatus, from a data store, and over a network, visitor data collected from one or more client devices accessing, over the network, one or more remote servers that manage websites visited by the one or more client devices;
identifying, by the one or more data processing apparatus, a change in a web analytics metric for a given website over a period of time, the web analytics metric being based at least in part on the visitor data associated with the one or more client devices accessing, over the network, the one or more remote servers to visit the given website during the period of time;
computing, by the one or more data processing apparatus, a respective segment contribution score for each of a plurality of segments of the web analytics metric, wherein the web analytics metric is a ratio metric, and wherein the respective segment contribution score for each of the plurality of segments is equal to:

$$k*(VS_{t2}-V_{t2})WS_{t2}-(VS_{t1}-V_{t1})WS_{t1},$$

wherein $V_{t1}$ is a value of the web analytics metric at an earliest time in the period of time, $V_{t2}$ is a value of the web analytics metric at a latest time in the period of time, $VS_{t1}$ is a value of the segment at the earliest time, $VS_{t2}$ is a value of the segment at the latest time, $WS_{t1}$ is a value of a weight time series of the segment at the earliest time, $WS_{t2}$ is a value of the weight time series of the segment at the latest time, and k is a normalization constant; and
identifying, by the one or more data processing apparatus, one or more of the plurality of segments as contributing to the change in the web analytics metric based on the respective segment contribution scores.

* * * * *